United States Patent [19]

Longsderff et al.

[11] 3,976,956
[45] Aug. 24, 1976

[54] LASER DEVICE AND A METHOD OF FABRICATION

[75] Inventors: Richard William Longsderff; Donald Bernard Kaiser, Lancaster, both of Pa.

[73] Assignee: RCA Corporation, New York, N.Y.

[22] Filed: Dec. 10, 1974

[21] Appl. No.: 531,395

[52] U.S. Cl. .................... 331/94.5 D; 331/94.5 G; 331/94.5 C; 65/59 A; 65/59 R; 52/759
[51] Int. Cl.² .................... H01S 3/08; H01S 3/082
[58] Field of Search .................. 331/94.5, ; 330/4.3; 65/59 A, 59 R; 52/759

[56] References Cited
UNITED STATES PATENTS

| | | | |
|---|---|---|---|
| 2,155,270 | 4/1939 | Johnson | 52/759 |
| 2,452,519 | 10/1948 | Daley | 52/759 |
| 3,851,275 | 11/1974 | Furuse | 331/94.5 G |

OTHER PUBLICATIONS

Wright et al., *Electronics,* vol. 47, June 13, 1974, pp. 91–95

*Primary Examiner*—Robert J. Webster
*Attorney, Agent, or Firm*—Glenn H. Bruestle; George E. Haas

[57] ABSTRACT

The metal end plates of a laser device are provided with relatively large annular hub portions extending outwardly from the laser envelope. Glass mirror blocks are used, each having a small area of a reflective coating in the center of one surface of the block. To bond the block to an end plate of the laser device, the mirror is aligned substantially on the axis of the hub and rf energy is used to heat the end of the hub to a sufficiently high temperature to seal it to the glass. The hub is brought into contact with the glass surface of the mirror block and a seal is made without damage to the mirror coating.

5 Claims, 2 Drawing Figures

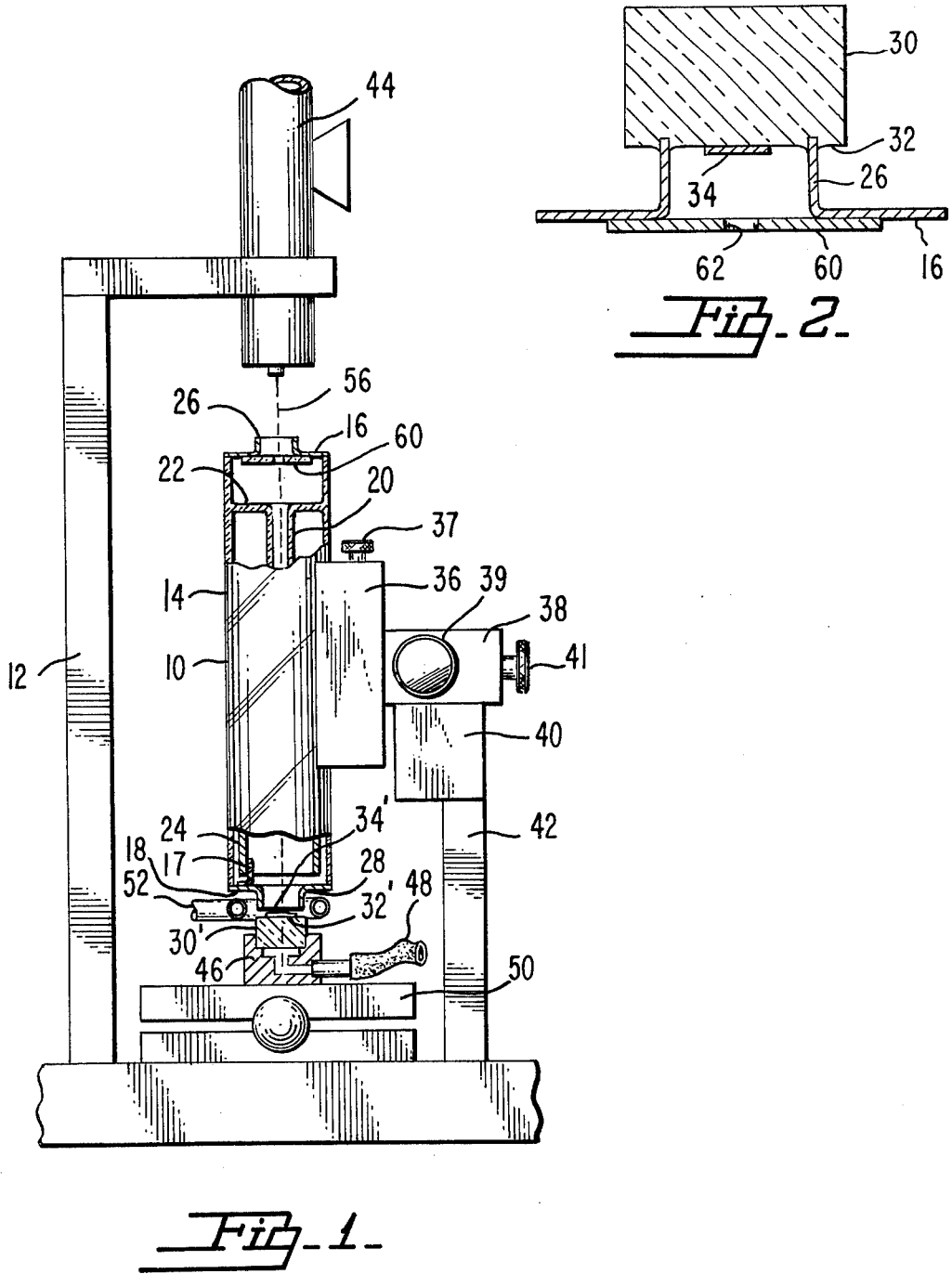

LASER DEVICE AND A METHOD OF FABRICATION

This invention is directed to a laser device comprising an envelope and metal end plate closure members for the laser envelope, which end plates are particularly adapted for sealing glass mirror member thereto, and to a method of sealing glass mirror members to the laser envelope with rf radio frequency energy.

BACKGROUND

A typical laser device of relatively few parts is disclosed and described in the copending application of Karl G. Hernqvist, Ser. No. 462,506, filed Apr. 19, 1974, U.S. Pat. No. 3,904,986 issued on Sept. 9, 1975. A laser device of this type comprises a tubular envelope, typically of a glass tube, having its two ends closed by metal end plates. Within the tube is mounted a laser bore member consisting substantially of a glass tube of small diameter extending coaxially within the glass tube of the envelope. Also, a metal cathode cylinder electrode extends within the laser envelope adjacent to one end and is electrically connected to the metal end plate closing that one end, which in turn provides an external electrical lead to the cathode cylinder. The other end plate closing the opposite end of the envelope tube provides the anode electrode of the laser device. Both of the end plates have central apertures aligned with the axis of the bore tube. On the outer surface respectively of each end plate is mounted a mirror block having a surface bonded to and closing the aperture of the end plate. Aligned with each end plate aperture and normally formed on the surface of the block closing the aperture is an optical mirror. The two mirrors, one formed on each block, together with the bore tube provide the optical lasing cavity of the laser device.

It is common practice to bond the mirror blocks to end plates of the laser with an epoxy adhesive material. An epoxy adhesive is used, since this allows the joining of the mirror blocks to the end plates at a relatively low temperature. The use of high temperatures to provide a bond between the mirror block and the respective end plate endangers the mirror coatings used in forming the mirrors. However, the disadvantage of using an epoxy adhesive is the relatively short life that an epoxy system provides. Over a period of time, in the order of one year or so, the epoxy adhesive deteriorates and loses its adhesive value. This enables the mirror blocks to become loose and become separated from the end plates thus ending the life of the laser device. Greater operating life is necessary for lasers used in video playback, facsimile and information retrieval applications, for example.

SUMMARY

In accordance with an embodiment of this invention, each end plate is formed with a relatively large annular hub or collar extending from the outer surface of the end plate. A glass mirror block is sealed to each hub. Each glass block has an optical mirror coating on one surface of the block, which coating is spaced around its periphery from the block edge. By using an rf heating coil adjacent to the end of the annular hub, the hub can be heated to a glass sealing temperature, at which time the glass block is moved into contact with the end of the hub to form a glass-to-metal seal between the glass block and the end plate.

In accordance with another embodiment of the invention, the glass mirror block is sealed to the annular hub of the respective end plate by aligning the axis through the center of the annular hub with and normal to the mirror on the glass block surface. The surface of the glass block with the mirror is closely spaced from the end of the hub. Using the rf coil the hub is heated to the glass sealing temperature and the glass block is pressed against the end of the hub to make the seal.

BRIEF DESCRIPTION OF THE DRAWINGS

FIG. 1 is a view, in elevation and partly in section, of a jig and an alignment structure, for sealing glass mirror blocks to a laser envelope.

FIG. 2 is a cross sectional view of a mirror block and end plate subassembly, used with the jig and alignment structure of FIG. 1.

DETAILED DESCRIPTION OF THE INVENTION

FIG. 1 discloses a partially fabricated laser device 10 mounted within a jig and an alignment structure 12, which is used to bond the mirror blocks to the end plates of the laser device. The laser 10 comprises a tubular glass envelope 14, which has annular metal end plates 16 and 18 sealed to its two ends. Within the glass tube 14 is a bore tube 20 which is specifically a smaller glass tube extending coaxially within the envelope 14. The bore tube 20 has a flared portion 22, which may be formed integrally with the bore tube, and has a peripheral edge sealed to the inner wall of the glass envelope 14. Coaxially mounted within the other end of the tubular envelope 14 is a metal cylinder 24 adjacent to the end plate 18. The metal cylinder 24 forms the cathode of the laser device and is joined by a metal wire 17 to the end plate 18, which becomes the cathode lead-in of the laser device.

The two end plates 16 and 18 are formed integrally with hub portions 26 and 28 respectively. These hub portions are annular hubs or collars extending longitudinally outwardly from the outer surface respectively of each end plate. The hubs are of uniform length, are substantially cylindrical and are formed coaxially with the center of the respective end plates. The length of each hub is not critical but, in one laser device of the type described, the end plates have a diameter of about 25 mm and the hub length is about 3 to 4 mm.

A glass mirror block is sealed to the outer end of and closes each hub structure 26 and 28. One mirror block is shown in detail in FIG. 2 and consists substantially of a cylindrical block 30 of glass, having a circular end surface 32 sealed to the end plate 16, as shown. At the center of the mirror block is formed a round optical reflecting mirror 34, formed from a plurality of coatings applied to the central portion of the surface 32. The periphery of the mirror 34 is spaced from the edge of the block surface 32, so as to provide a sufficiently large annular area around the mirror 34, to which the hub of the end plate can be sealed without harming the mirror coating by the high temperature used in making the seal. In the tube of the type described, the diameter of the mirror block 30 is about 15 mm, while the mirror coating 34 at the center of surface 32 has a diameter of about 3 mm. This then provides an annular spacing between the hub 26 and the mirror 34 of substantially 6 mm wide.

The particular design of the glass mirror blocks together with the end plates 16 and 18 permit the use of rf energy to bond the mirror blocks to the end plates. For this purpose the jig 12 of FIG. 1 is used. The laser envelope 10 is mounted within the jig and fixed to a supporting block 36, which in turn may be mounted to a second block 38 for movement up and down in a vertical direction by use of a manual control knob 37. The second block 38 may be moveably mounted on a third supporting block 40 for movement back and forth in a horizontal direction relative to the block 40 by use of a manual control knob 39. The supporting block 40 also may be mounted for horizontal movement relative to the fixed support 42 of the jig and in a direction perpendicular to the horizontal movement of block 38 relative to the supporting block 40 under the control of a manually operated knob 41. This arrangement of moveable blocks permits an operator to move the laser device to any required position within limits along the $x$, $y$ and $z$ coordinates.

Fixed to the jig 12 is an autocollimator 44 for providing an accurately positioned, vertically-directed light beam directed downwardly along a path 56 through the laser device 10. A glass mirror block 30' is supported on the jig 12 by a vacuum chuck 46, which is connected by an appropriate conduit system 48 to a vacuum pump (not shown). The vacuum chuck 46 is fixed at the center of a tilt table 50, which can be tilted about two horizontal axes normal to each other. An rf heating coil 52 is mounted, as schematically shown, adjacent to the optical surface of the block 30'.

To seal the glass mirror block 30', shown in FIG. 1, to the end plate 18 of the laser device, the mirror block 30' with a mirror 34' formed thereon is placed in the vacuum chuck 46, where it is tightly held by the vacuum established from the vacuum pump. The glass block, in this position, is aligned with the vertical light path 56 from the autocollimator 44. Light from the autocollimator then is directed onto substantially the center of the mirror 34'. The table 50 is tilted about its two axes until the light beam reflected from the mirror 34' is directed upwardly along the beam path 56 as detected by the autocollimator 44. The laser envelope 10, placed into the jig block 36, is positioned by the various possible adjustments described until the light beam 56 from the collimator 44 and the coincident beam from mirror 34' pass through the end plates 16 and 18 and along the axis of the bore tube 20. This can be determined in the collimator by the observed position of the light, which is reflected from the mirror 34'. If the light beam is not substantially aligned with the bore of the bore tube 20, the spot formed in the collimator 44 by the reflected light from mirror 34' is large and diffused, due to the reflection of the light from the walls of the bore tube 20. Adjustment of the laser envelope is made until the observed light spot is well defined.

With the mirror 34' and the laser envelope 10 aligned in the manner described above, power is applied to the rf coil 52 in the center of which the hub 28 of the end plate 18 has been positioned. The hub is heated by the rf power to a temperature around 1000°C, which causes the hub 28 to appear with a red glow. At this temperature the laser device 10, as viewed in FIG. 1, is lowered until the end of the hub 28 makes contact with the surface 32' of the glass block 30'. The glass in the region at which the hub 26 makes contact with the glass surface 32' will melt and wet the end periphery of the hub 28 so that a hermetically-tight glass-to-metal seal is formed between the hub 26 and the glass block 30'. The rf power is turned off. Upon cooling, the glass of block 30' tightly adheres to the end of the hub 26 and the seal firmly supports the glass block 30' with the mirror 34' accurately aligned with the axis of the bore tube 20.

The other glass block 30 can be then sealed, in the manner described above, to the end plate 16 by rotating the laser device 10 within the jig 180° to reverse its position disclosed in FIG. 1. An alternative method would be to provide a second rf coil 52 adjacent to the end plate 16 and surrounding the hub 26. The second glass block 30 could be supported above hub 26 by a vacuum chuck, which can be properly oriented to align the mirror 34 of the second glass block with the bore of the bore tube 20, as the mirror at this end of the laser would be partially transmissive. Thus, the second glass block 30 may be sealed simultaneously to the respective end plates 16 and 18 or in sequence, without rotating the position of the laser tube 10.

It is desirable that the blocks 30 and 30' be of a glass which is matched as to its thermal expansion characteristics with the metal of the end plates 16 and 18; and the metal of the end plates is selected to provide a good seal with the glass of blocks 30 and 30'. For example, the glass may be of a type formed of 21% PbO, 6% $K_2O$, 7% $Na_2O$ with the remainder being substantially $SiO_2$. To this type of glass, an iron-nickel alloy forms a good seal, wherein the nickel is substantially 52% of the alloy. Another metal which seals well to this type of glass is an iron, nickel and chromium alloy, wherein the nickel is around 41–42.5%, the chromium is 5.4–5.9% and the remainder is substantially all iron with an amount of aluminum up to 0.15% maximum of the alloy.

The sealing of the glass blocks 30 and 30' to the hubs of the end plates, as described, can be successfully done with glasses of the type given above. The reason that the mirror coatings 34 and 34' are not destroyed by the heated hub is that this type of glass has very poor thermal conductivity and the heating and melting of the glass during the sealing operation is very local and closely adjacent to the regions of the surfaces 32 and 32' contacted by the end of the hubs. Thus, the glass of surface 32 or 32' is heated and melted in a very small region and only for the time necessary for the glass to wet the surface of the metal hub. This is observable by the operator and as soon as the wetting takes place completely around the periphery of the hub, the heat can be removed from the seal region.

The end plates 16 and 18 can be formed by any appropriate metal working process including a firing and oxidizing step to provide a good glass-to-metal sealing surface for the metal part. The metal end plates 16 and 18 may also be mounted at the open ends of the glass envelope tube 14 by an rf seal, prior to the bonding of the mirror blocks 30 to the hub portions of the end plates. The end of the laser envelope closed by the end plate 16 is the output end of the laser and the mirror 34 of the mirror block 30 attached to this plate 16 is partially transmissive to provide an output from the laser device during operation. To further define and limit the beam, a metal plate 60 is mounted across the surface of the plate 16 opposite to that from which the hub 26 extends. Plate 60 is provided with an aperture 62 which is aligned with the bore of the bore tube 20 and with which the mirror 34 is also aligned, when the mirror block 30 is sealed to the hub 26.

The mirror blocks 30 and 30' have been described as glass cylinders. However, other configurations of the blocks are possible, such as cubes of glass fabricated in the manner described in the copending application Ser. No. 490,401, filed on July 22, 1974 by Arthur H. Firester now abandoned but subject of continuation-in-part Ser. No. 532,061 filed on Nov. 12, 1975.

The described glass-to-metal seal between the mirror blocks and the metal end plates of the tube envelope eliminates the need for the use of an epoxy adhesive, which has a relatively short life. The design of the end plates permits the use of such a glass-to-metal seal without damage to the mirror surface during sealing. An rf heating technique provides sufficient control of the sealing process, which is somewhat critical with respect to possible damage to the mirror coatings.

We claim:
1. A laser tube comprising:
   an open ended tube;
   a metal plate extending across and sealed to one end of the tube;
   an annular hub extending longitudinally outward from the metal plate coaxial with the tube;
   a glass block extending across and closing the outer end of the hub, the outer end of the hub extending into the body of the block so that the block is sealed to the hub; and
   an optical mirror on the surface of the glass block within and spaced from the hub.
2. A laser tube in accordance with claim 1, wherein a tubular member is positioned within said envelope and has a bore coaxially aligned with said hub, and a plate structure fixed to the other surface of said metal plate and having an aperture therethrough coaxially aligned with said hub.
3. The laser tube in accordance with claim 1 further comprising a metal cylinder within the tube and adjacent to the one end thereof.
4. A mirror assembly for use in forming an optical laser cavity in a laser tube comprising:
   a metal plate having an annular hub extending from one surface of the metal plate;
   a glass block extending across the end of the hub which extends from the metal plate, the end of the hub being embedded in the glass block; and
   a mirror on the surface of the glass block within and spaced from the hub.
5. A closure member in accordance with claim 4, wherein a plate structure is fixed to the other surface of said metal plate and extends across the other end of said hub, said plate structure having an aperture therethrough coaxial with said hub.

* * * * *